United States Patent [19]
Chambers

[11] Patent Number: 5,351,333
[45] Date of Patent: Sep. 27, 1994

[54] OPTICAL FIBER CLEAVER

[76] Inventor: Arthur E. Chambers, 19737 Parke La., Grosse Ile, Mich. 48138

[21] Appl. No.: 127,826

[22] Filed: Sep. 28, 1993

[51] Int. Cl.⁵ ............................................. B26D 3/08
[52] U.S. Cl. ...................... 385/134; 30/308; 83/582; 83/879; 225/96; 225/96.5; 385/147
[58] Field of Search ............... 385/134, 136, 137, 147; 225/1, 2, 93, 94, 96, 96.5, 101, 103–105; 81/9.44; 83/879, 582, 586, 587; 30/272.1, 278, 308, 320, 321

[56] References Cited

U.S. PATENT DOCUMENTS

| | | | |
|---|---|---|---|
| 4,154,385 | 5/1979 | Lewis | 225/96.5 |
| 4,159,793 | 7/1979 | Belmonte et al. | 225/96.5 |
| 4,445,632 | 5/1984 | Margolin et al. | 225/2 |
| 4,573,617 | 3/1986 | Durkow | 225/96 |
| 4,619,387 | 10/1986 | Shank et al. | 225/96.5 |
| 5,046,252 | 9/1991 | Ayuta et al. | 81/9.44 X |
| 5,188,268 | 2/1993 | Hakoun et al. | 225/96.5 |

Primary Examiner—John D. Lee
Attorney, Agent, or Firm—Howard & Howard

[57] ABSTRACT

An optical fiber cleaver is disclosed wherein a blade applies a pre-set force to an optical fiber to form a notch in that optical fiber. In a preferred embodiment, a spring applies a pre-set force to the blade such that should an undue amount of force be applied to the fiber from the blade, the blade will overcome the spring force and not move towards the fiber any further. The cleaver is preferably formed from two pivotally connected handle portions each including holder portions which come into mating contact with each other to provide a stop against further pivoting movement. At that time, the blade is forced into the optical fiber to cleave the optical fiber. In a further feature of this invention, an optical fiber guide provides a stop between an insulated portion of the optical fiber, and a stripped portion. The optical fiber guide is adjustable to adjust the distance between the end of the insulation and the location of the notch. By adjusting the optical fiber guide, one is able to achieve a desired length of stripped fiber between the end of the insulation and the formed notch.

20 Claims, 2 Drawing Sheets

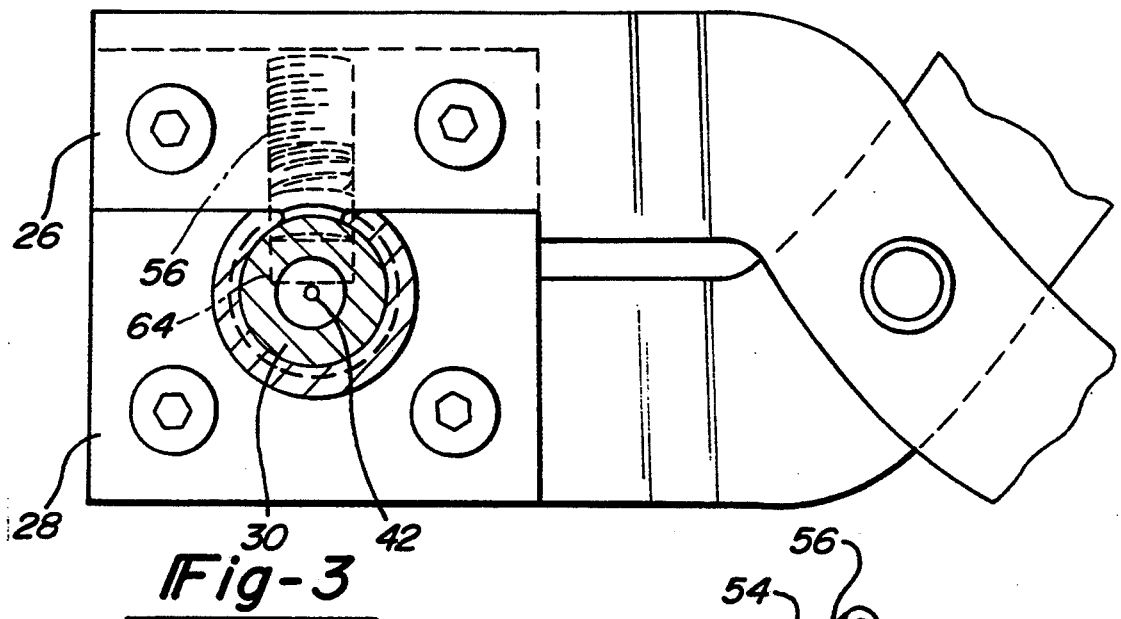
Fig-3
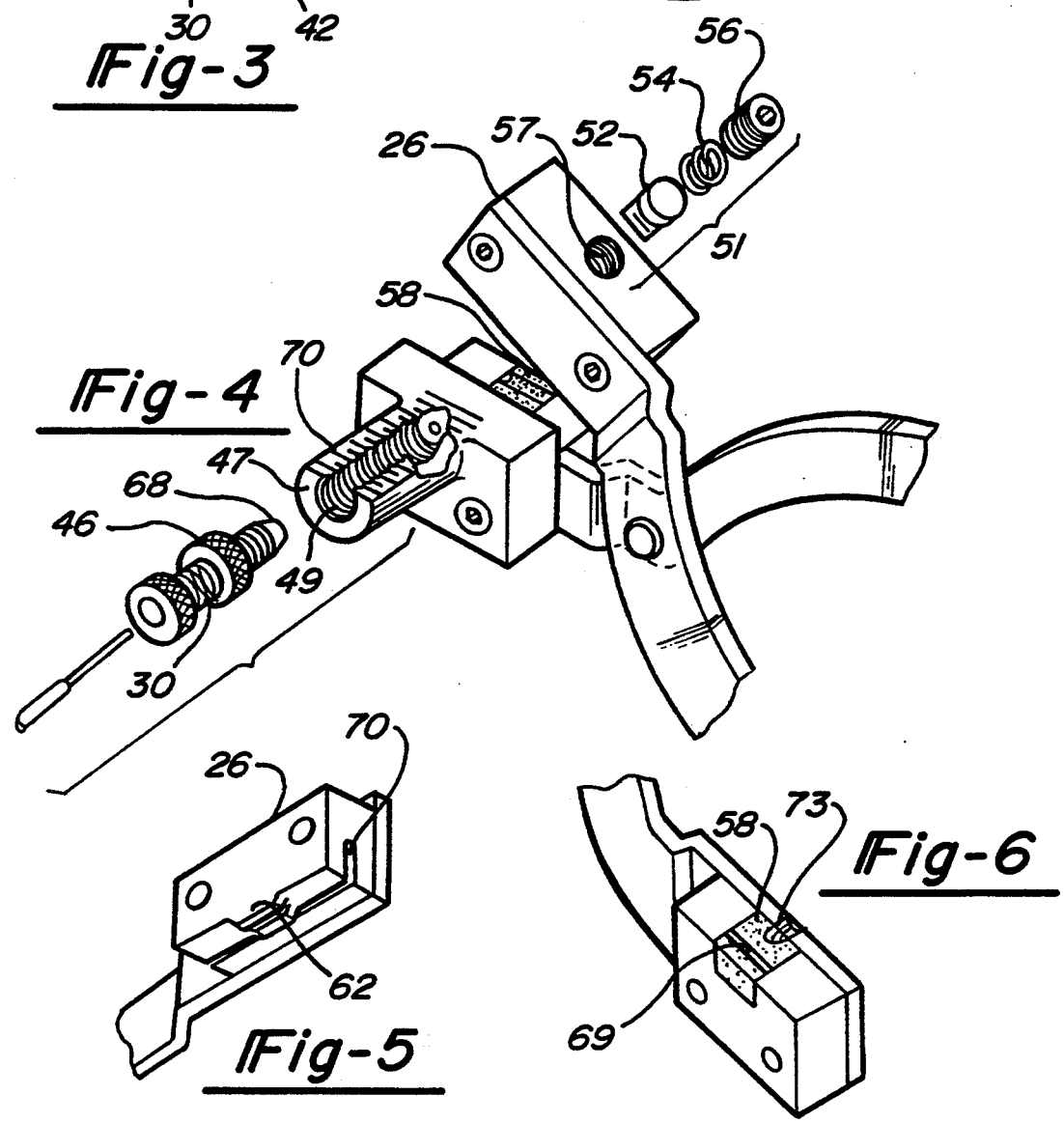
Fig-4
Fig-5
Fig-6

OPTICAL FIBER CLEAVER

BACKGROUND OF THE INVENTION

This application in general relates to a cleaver for forming a notch or notch in an optical fiber such that the optical fiber may be separated using that notch as a score line.

Optical fibers find increasing use in the communication of various types of information, signals, or other energy transmission uses. It is necessary to form a well-defined square end on the fiber for connection to various optical fiber connectors. Essentially, the end face should be perpendicular to the axis of the fiber. It has been found that to form an acceptable end, it is preferable to cleave the optical fiber; that is, form a very, small notch, and then separate the optical fiber at that notch rather than cutting the optical fiber. When the fiber is cut, the end face is seldom perpendicular to the axis. Various types of optical fiber cleavers are known in the prior art to accomplish this goal.

With some prior art cleavers some degree of "feel" is necessary in order to properly utilize the cleaver. That is, with prior art cleavers an operator can apply too much or too little force to the optical fiber, which would in turn modify the notch formed in the optical fiber. It would be desirable to achieve a consistent well defined notch in the optical fiber such that there is repeatability in the formation of the end faces on the optical fiber. The known optical fiber cleavers have not provided such repeatability, and have instead utilized a generally fixed blade which is brought into contact with the fiber to cleave the fiber. With such systems, the feel of the operator to modify the amount of force applied to the tool is an important variable which changes the precision of the formed end face. Moreover, the known optical fiber cleavers are relatively complicated to use.

SUMMARY OF THE INVENTION

In a disclosed embodiment of this invention, an optical fiber cleaver is provided which applies a pre-set force to the optical fiber such that a repeatable notch is formed in the optical fiber. In one disclosed embodiment of this invention, a blade is brought into contact with the outer periphery of the optical fiber to form the notch. With the optical fiber remaining within the tool, and with the blade contacting the optical fiber, the optical fiber is separated at the notch to form the cut end. The end face formed at the notch is repeatable and as desired. Since the spring is biasing the blade into the optical fiber, one need not achieve any degree of feel for the amount of force to be applied to the tool.

The tool is provided with the blade on a first pivotable handle portion, and a pad on a second pivotable handle portion. The two handle portions are brought together like a pair of pliers until the pad and blade holder are in mating contact. At that time, the blade will have moved into contact with the outer periphery of the optical fiber and form the notch. To form the notch one merely needs to move the two tool handles toward a closed position. The spring applies a pre-set force to the blade. Once that force is overcome, the blade will not move any further, and the notch will not be formed any deeper.

In a preferred embodiment of this invention, the blade is disposed in a bore in a first handle portion. A spring biases that blade downwardly towards a pad which receives the optical fiber. Preferably, the blade is at an angle. The two handles are brought together, and the cleave is formed. Once the pre-set force is reached, any additional force will cause the blade to overcome the spring force and not move any further toward the optical fiber.

One embodiment of the present invention allows the easy modification of the pre-set force by tightening or loosening a set screw which changes the force from the spring applied to the blade. Moveover, the angle of the blade may be varied, as may be the hardness of the pad. The hardness of the pad provides a reaction force through the fiber to the blade which also controls the depth of notch formed in the fiber by the blade, and the force applied to the optical fiber.

In a further feature of this invention, an optical fiber guide is mounted on the pad handle portion. The optical fiber guide allows a pre-stripped portion of optical fiber to move through a central opening in the guide. In a sense, the guide acts as a stop for insulated fiber such that only a stripped portion can move through the guide. The guide is adjustably mounted relative to the pad such that one forms the notch at a pre-defined distance from the end of the insulated portion on the optical fiber.

When one wishes to use the inventive optical fiber cleaver, one initially strips a portion of optical fiber of its outer insulation. The stripped portion of the fiber is then inserted through the guide. The guide is adjusted relative to the pad to a position such that a desired length of optical fiber extends beyond the insulated portion. The handles are brought together and the notch is formed. The remaining end of the fiber is separated at the notch. The optical fiber has now been prepared such that an acceptable end face has been formed at the end of the stripped portion. This end face will be properly formed repeatedly, since no feel is necessary. Further, there is a pre-determined length of stripped portion between the insulation and the end face.

In preferred embodiments of this invention, the guide is rotatable relative to a threaded holder on the pad handle portion. Further, incremental distance marks are placed on the holder portion such that one can select the predetermined length of stripped fiber.

In one method of utilizing an embodiment of this invention, one initially positions the guide at a desired length relative to the cleaver and pad. One then begins to form notches in the optical fiber until a desired end face is achieved. Until that desired end face is achieved, the set screw is adjusted to change the force on the blade. Once a proper notch depth is obtained (as evidenced by the end face that is formed), the set screw is left at that position applying the pre-set force to the blade. One may then utilize the optical fiber cleaver, by merely bringing the two handle portions together until the blade holder is in mating contact with the pad holder. No reliance on any "feel" is required. As a preferred alternative, the desired spring force can be determined at a factory and the units factory sealed at that force.

As an alternative to this pre-set use, it is possible to bring the cleaver to a closed position, and then manually actuate the blade and spring. For this use, elastic rings may be positioned below the spring, and the spring receives a force from a user. In such a system, the set screw is eliminated.

BRIEF DESCRIPTION OF THE DRAWINGS

FIG. 3 is an enlarged cross-sectional view on an enlarged basis of the cleaver shown in FIG. 1.

FIG. 4 is a partial assembly view of the cleaver illustrated in FIG. 3.

FIG. 5 is a detail of a blade holder according to the present invention,

FIG. 6 is a detail of the pad holder of the present invention.

DETAILED DESCRIPTION OF THE PREFERRED EMBODIMENT

Figure 1:
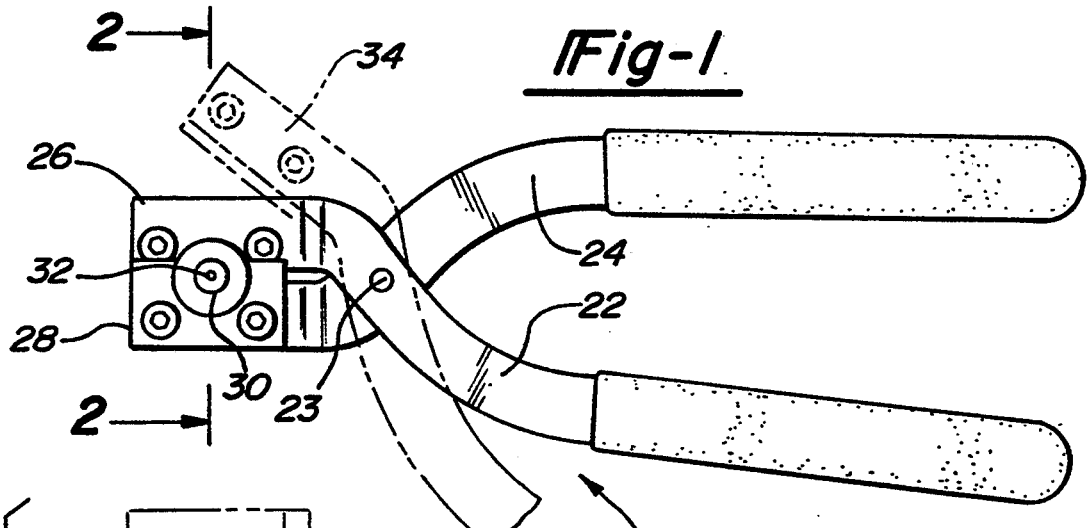
FIG. 1 is a schematic view showing the optical fiber cleaver of the present invention.

An optical fiber cleaver 20 is illustrated in FIG. 1 for forming a notch in an optical fiber. As shown, a blade handle portion 22 is pivotally connected at 23 to a pad handle portion 24. Handles 22 and 24 are operated to pivot at the pivot point 23 much like a pair of pliers. A blade holder 26 is connected to move with blade handle 22, and similarly, a pad holder 28 moves with pad handle 24.

An optical fiber guide holder 30 receives an optical fiber guide 32, for a purpose which will be described below. With the blade handle moved to the position shown in phantom at 34, an optical fiber is initially stripped and moved through the optical fiber guide 32. The handle portions 22 and 24 are then brought together, and a blade in blade holder 34 forms a notch in the optical fiber. The end of the optical fiber may then be separated from the remainder of the fiber at that notch, and a desired end face will be formed at the notch.

Figure 2:
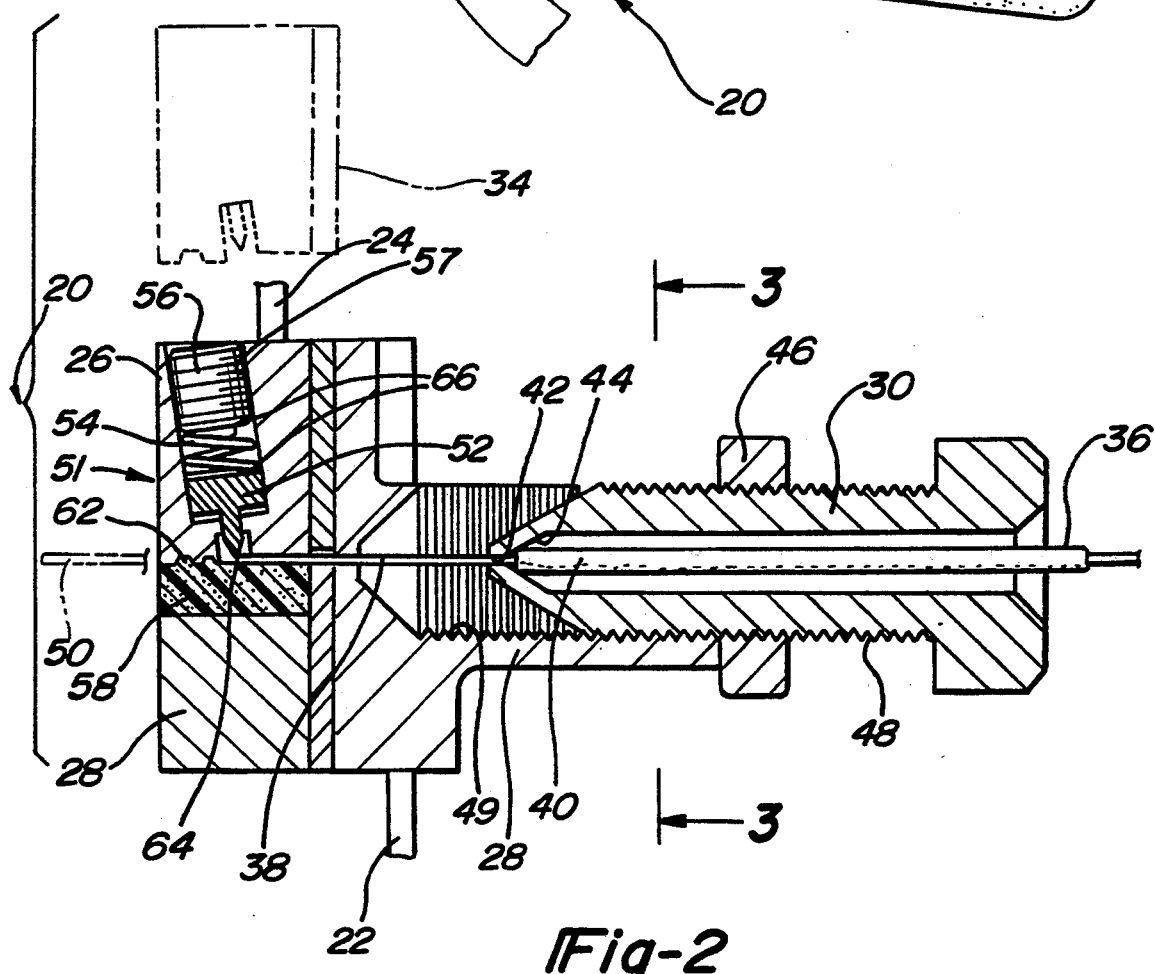
FIG. 2 is a cross-sectional view along line 2—2 as shown in FIG. 1.

As shown in FIG. 2, the optical fiber cleaver 20 receives an optical fiber 36 having a stripped portion 38, and an insulated portion 40. As shown, stripped portion 40 can move through an opening 42 at the front of guide 30, while insulated portion 40 stops at a conical end face 44 within the guide 30. The optical fiber 36 is preferably stripped prior to being inserted through the fiber guide 30. A nut 46 is moved along threads 48 at the outer periphery of guide 30. Once the nut is at a desired position, the entire guide 30 is rotated relative to a semi-cylindrical tubular boss 47 having threads 49. As will be explained below, marks on the boss 47 will provide an indication of the length of fiber 38 between the end of insulation 40, and the notch.

An end 50 of the optical fiber extends beyond the area where the notch will be formed. A blade assembly 51 includes a carbide blade 52, a spring 54, and a set screw 56 all received within a bore 58 in the blade holder 34. A thumb screw can also be used for easy operator adjustment. A pad 58 is formed on pad holder 28 to have a curvature facing upwardly. Clamps 62 are formed on blade holder 26, and grab the optical fiber as the handle members are pivoted together. Clamps 62 wrap the optical fiber around pad 58 such that the optical fiber is held tightly on the curvature of the pad 58.

When the blade handle 22 and pad handle 24 are in the closed position such as shown in FIG. 2, the blade tip 64 is brought into contact with she outer periphery of the stripped portion 38 of the fiber 36. A notch is then formed in the outer periphery. The end 50 may then be separated at the notch, such that a clean end face is formed on the optical fiber. The distance between that end face and the end of the insulation portion 40 is as desired due to guide 30. Optical fiber 36 may then be connected to an optical fiber system.

With this invention, one need not apply any particular feel to the tool to achieve a desired notch. Rather, one merely needs to pivot the two handles 22 and 24 relative to each other until the blade handle 26 abuts the pad handle 28. The blade tip 64 thus forms a desired, repeatable notch. Should an undue amount of force be applied from the blade to the optical fiber, the blade will overcome the spring force 54 and not move any further toward the optical fiber. Thus, too much of a notch will not be formed.

When it becomes desirable to adjust the force on the blade 52, one may tighten or loosen set screw 56, to, in turn, change the spring force from spring 54. This can be done initially to set the spring force. Further, it may be desirable to insert elastic rings such as rings 66, with one above and one below the spring 54. Rings 66 assist in transmitting the force between the blade 52 and the spring 54. Further, the rings will eliminate metal-to-metal contact between set screw 56, spring 54, and blade 52.

As shown in FIG. 3, with the blade holder 26 brought into contact with the pad holder 28, the tip 64 of the blade would come into contact with the outer periphery of the center portion of the optical fiber. Thus, the blade tip 64 will form a small notch in the optical fiber.

As shown in FIG. 4, a plurality of marks or indicia 70 are formed on the boss 47. By moving the optical fiber guide 30 relative to boss 47 such that end point 68 is at a position relative to the mark 70, one can determine the amount of optical fiber which extends beyond the insulated portion. As also shown, the blade assembly 53 includes the set screw 56, elastic rings 66, spring 54, and the blade 52. As shown, all of these members are received in the bore 57. Further, as shown in FIG. 4, a ditch 69 is formed in pad 58.

As shown in FIG. 5, clamps 62 are positioned adjacent to a blade slot 70. It is preferred the blade and the clamps 62 extend for approximately the same extent along slot 70. As shown, blade slot 70 is on a slight angle relative to a plane perpendicular to the pivot axis of pin 23. The blade is on an angle such that it is directed to the center of the radius of the pad. In this way, the fiber will be stretched taut against the pad, and the blade will form the notch moving into the fiber. Thus, when the blade holder 26 is brought into contact with the pad holder 28, the blade 64 will form a notch at a small angle relative to the pivot axis. It is preferred that the angle be on the order of 15° relative to the axis.

As shown in FIG. 6, pad holder 28 includes a groove 73 which receives the optical fiber. Groove 73 extends perpendicularly toward a ditch 69. The optical fiber is placed in that groove 73, and held there. The blade holder 26 is then brought into contact with the pad holder 28 and the notch is formed.

As an alternative to this "automatic" or pre-set mode of operation, wherein a pre-set force is applied to the blade, one may eliminate the set screw 56, and place two elastic rings on the outer side of the spring 54. One may then close the handles and apply a manual force downwardly on the elastic rings, through the spring 54 and into blade 52, forcing blade 52 into the optical fiber.

In a preferred embodiment of this invention, the notch will be on the order of 0.000030"-0.000090." Thus, the blade only forms a very small nick in the fiber.

In a further feature of this invention the pad is preferably formed of a polyurethane. One type of optical fiber may have an outer diameter of 250 microns when fully insulated. The optical glass core will typically only be 20-30 microns, and a quartz glass outer cladding will be of approximately 125 microns. Other size fibers can be used by adjusting the sizes of the optical fiber guide bore.

A main inventive feature of this invention is the fact that the blade will apply a pre-set force to the fiber to form the desired notch depth, and achieve a desired end face. Should an undue amount of force be applied from the blade to the optical fiber, the blade will overcome the spring force, and not move further toward the optical fiber. As mentioned above, the cleaver is preferably set to a fixed force on the blade, such that it will not be adjustable.

A preferred embodiment of this invention has been disclosed, however, a worker of ordinary skill would recognize that certain modifications would come within the scope of this invention. For that reason the following claims should be studied in order to determine the true scope and content of this invention.

I claim:

1. An optical fiber cleaver comprising:
   first and second handle portions, said first and second handle portions being pivotally connected, and having holder portions, the holder portion of one of said first and second handle portions carrying a blade, and the other of said holder portions being adapted to hold an optical fiber such that when the handle portions are pivoted together to a closed position, said blade contacts the optical fiber held on said other holder portion; and
   said blade being biased towards said other holder portion when in said closed position by a pre-set force such that when said pre-set force is overcome, said blade does not move further against an optical fiber, said preset force being supplied by a spring.

2. An optical fiber cleaver as recited in claim 1, wherein said pre-set force is provided by a coil spring.

3. An optical fiber cleaver as recited in claim 2, wherein said blade and said spring are received in a bore in said one holder portion.

4. An optical fiber cleaver as recited in claim 3, wherein an adjustable set screw is received in an end of said bore and may be turned to vary the spring force applied to said blade.

5. An optical fiber cleaver as recited in claim 1; wherein said blade is positioned at an angle relative to a plane which is perpendicular to a pivot axis of said first and second handle portions.

6. An optical fiber cleaver as recited in claim 5, wherein said other of said holder portions receives a plastic pad providing an underlying support surface for the optical fiber as said blade contacts the optical fiber.

7. An optical fiber cleaver as recited in claim 6, wherein said plastic pad defines a curved surface facing the optical fiber, and wherein said blade is directed at an angle relative to a pivot axis of said handle portions.

8. An optical fiber cleaver as recited in claim 7, wherein said blade is directed to a center of a radius of curvature of said pad.

9. An optical fiber cleaver as recited in claim 1, wherein an optical fiber guide provides a stop for an insulated portion of said fiber such that a desired length of stripped fiber can be formed between the end of said insulated portion and an end face formed by said blade.

10. An optical fiber cleaver as recited in claim 9, wherein said guide is threaded relative to said holder portion such that said length can be varied.

11. An optical fiber cleaver as recited in claim 10, wherein said holder portion includes a plurality of marks to allow one to select a desired length.

12. An optical fiber cleaver as recited in claim 1, wherein said blade is positioned in said one handle portion such that when said first and second holder portions being pivoted together toward said closed position, said blade faces said other of said holder portions.

13. An optical fiber cleaver as recited in claim 12, wherein said blade is positioned in said one holder portion such that it is effectively brought downwardly into contact with said optical fiber.

14. An optical fiber cleaver as recited in claim 1, wherein said spring is received in a bore which is closed to prevent adjustment of said pre-set force.

15. An optical fiber cleaver as recited in claim 14, wherein said other of said holder portion receives a plastic pad providing an underlying support surface for the optical fiber as said blade contacts the optical fiber.

16. An optical fiber cleaver comprising:
    a blade;
    a holder portion for holding an optical fiber, an optical fiber guide being fixed to said holder portion, said optical fiber guide having a stop portion such that a predetermined length of stripped optical fiber can move beyond an insulated portion of said optical fiber towards a location where said blade will form a notch in said optical fiber, and such that a desired length of stripped optical fiber will be formed between the notch and the end of the insulation, said stop portion being provided by a bore extending through said optical fiber guide, said bore having a inner diameter selected to be greater than the outer diameter of a stripped optical fiber, and less than the outer diameter of the insulated portion of the optical fiber such that said stop portion will prevent movement of said insulated portion of the optical fiber through said bore.

17. An optical fiber cleaver as recited in claim 16, wherein said guide is threaded relative to said holder portion such that said length can be varied.

18. An optical fiber cleaver as recited in claim 16, wherein said holder portion includes a plurality of marks to allow one to select a desired length.

19. An optical fiber cleaver comprising:
    a pair of pivotally connected handle portions;
    one of said handle portions carrying a blade;
    a second of said handle portions carrying a holder portion for holding an optical fiber, an optical fiber guide being fixed to said holder portion, and said optical fiber guide having a stop portion such that a pre-determined length of stripped optical fiber can move beyond said stop portion towards a location where said blade will form a notch in said optical fiber, and such that a desired length of stripped optical fiber will be formed between the notch formed by said blade, and the end of the insulation, said stop portion being provided by a bore extending through said optical fiber guide, said bore having a inner diameter selected to be greater than the outer diameter of a stripped optical fiber, and less than the outer diameter of the insulated portion of the optical fiber such that said stop portion will prevent movement of said insulated portion of the optical fiber through said bore.

20. An optical fiber cleaver as recited in claim 19, wherein said holder portion receives a hard plastic pad acting as an underlying support surface for the optical fiber as said blade contacts the optical fiber.

* * * * *